United States Patent
Kollman et al.

(10) Patent No.: US 8,505,422 B2
(45) Date of Patent: *Aug. 13, 2013

(54) CUTTING MACHINE FOR BLINDS

(75) Inventors: Michael Kollman, Fitchburg, WI (US); Adam Ward, Sherwood, OR (US)

(73) Assignee: Lumino, Inc., Madison, WI (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/895,131

(22) Filed: Sep. 30, 2010

(65) Prior Publication Data

US 2011/0017033 A1    Jan. 27, 2011

Related U.S. Application Data

(62) Division of application No. 11/475,415, filed on Jun. 27, 2006, now Pat. No. 7,806,030.

(60) Provisional application No. 60/695,098, filed on Jun. 29, 2005.

(51) Int. Cl.
*B23D 23/00* (2006.01)

(52) U.S. Cl.
USPC ................................. 83/13; 83/198; 83/467.1

(58) Field of Classification Search
USPC ............... 83/198, 197, 13, 39, 452, 694, 553, 83/552, 397, 471, 370, 467.1; 29/24.5
See application file for complete search history.

(56) References Cited

U.S. PATENT DOCUMENTS

| | | |
|---|---|---|
| 4,819,530 A | 4/1989 | Huang |
| 4,993,131 A | 2/1991 | Graves et al. |
| 5,072,494 A | 12/1991 | Graves et al. |
| 5,103,702 A | 4/1992 | Yannazzone |
| 5,333,365 A | 8/1994 | Marocco et al. |
| 5,339,716 A | 8/1994 | Sands et al. |
| 5,375,307 A | 12/1994 | Rossiter |
| 5,456,149 A | 10/1995 | Elsenheimer et al. |
| 5,799,557 A | 9/1998 | Wang |
| 5,806,394 A | 9/1998 | Marocco |
| 5,816,126 A | 10/1998 | Pluber |
| 5,927,172 A | 7/1999 | Wang |
| 6,079,306 A | 6/2000 | Liu |
| 6,089,134 A | 7/2000 | Marocco |
| 6,178,857 B1 | 1/2001 | Marocco |
| 6,196,099 B1 | 3/2001 | Marocco |
| 6,334,379 B1 | 1/2002 | Sundano |
| 6,336,388 B1 | 1/2002 | Marocco |
| 6,357,716 B1 | 3/2002 | Kratish et al. |
| 6,412,381 B1 | 7/2002 | Wang |

(Continued)

*Primary Examiner* — Stephen Choi
(74) *Attorney, Agent, or Firm* — Buchanan Ingersoll & Rooney PC

(57) ABSTRACT

In a cutting machine for cutting down venetian blinds a headrail cutter and a bottom rail cutter are provided which move along a horizontal axis. After the headrail and bottom rail are trimmed a slat cutter moves in a vertical axis, up or down to cut the slats. The cutting machine enables one to cut down a venetian blind while the opposite end of the blind remains in the packing box. Preferably, a spacer or collar is provided on the blind prior to packaging so that the headrail, window covering material and bottom rail will be spaced apart from one another a desired amount. That spacing should be the same spacing as the openings in the cutting machine so that when one end of the blind is removed from the package that end of the blind can be readily inserted into the cutting mechanism.

35 Claims, 8 Drawing Sheets

(56) References Cited

U.S. PATENT DOCUMENTS

| | | |
|---|---|---|
| 6,427,571 B1 | 8/2002 | Hsu |
| 6,435,066 B1 | 8/2002 | Kutchmarek |
| 6,604,443 B2 | 8/2003 | Roberts et al. |
| 6,615,698 B2 | 9/2003 | Chuang et al. |
| 6,681,673 B1 | 1/2004 | Kutchmarek et al. |
| 6,688,204 B2 | 2/2004 | Huang |
| 6,761,099 B2 | 7/2004 | Lin et al. |
| 6,945,152 B2 | 9/2005 | Jabbari et al. |
| 6,971,296 B2 | 12/2005 | Lin et al. |
| 7,000,516 B2 | 2/2006 | Lin et al. |
| 7,007,576 B2 | 3/2006 | Roberts et al. |
| 2002/0020506 A1 | 2/2002 | Dekker et al. |
| 2003/0066403 A1 | 4/2003 | Lin et al. |
| 2003/0140756 A1* | 7/2003 | Lin et al. ............ 83/454 |
| 2004/0149104 A1 | 8/2004 | Jabbari et al. |
| 2005/0188515 A1 | 9/2005 | Reimer et al. |
| 2006/0179991 A1* | 8/2006 | Nien et al. ............ 83/622 |

* cited by examiner

CUTTING MACHINE FOR BLINDS

CROSS REFERENCE TO RELATED APPLICATION

The present application is a divisional application of U.S. patent application Ser. No. 11/475,415, which was filed on Jun. 27, 2006. Applicants claim the benefit of U.S. Provisional Patent Application Ser. No. 60/695,098, filed Jun. 29, 2005.

FIELD OF INVENTION

The invention relates to a machine that is used to trim stock sizes of venetian type blinds to fit an opening whose dimensions are provided by a customer.

BACKGROUND OF THE INVENTION

Many home centers and other retailers of window covering products purchase venetian blinds in stock sizes from a blind manufacturer and display those blinds in retail store locations. These retailers have machines, called cut-down machines, which a salesperson or technician can use to trim a stock blind to fit a window, door or other opening having dimensions smaller than the dimensions of a stock blind. Typically, the customer provides these dimensions. For example, a customer may tell a salesperson that the dimensions of the window to be covered by the blind are 34 inches wide and 48 inches tall. The stock blind closest to those dimensions is 36 inches wide and 48 inches in length. Consequently, it will be necessary to cut two inches from the width of the stock blind to create a blind that will fit the customer's window. Because the customer usually wants each of the two ladders in a venetian blind of this size to be the same distance from the edge of the blind nearest the ladder, the retailer will cut away an equal amount of material from each edge of the blind rather than cut all the material from one edge of the blind. In the example, one inch would be cut from each edge of the blind. If the blind is too long for the opening, extra slats or other window covering material can be removed from the bottom of the blind. A cut-down machine is not used for this purpose.

There are several types of blind trimming machines known in the art. One type of machine, disclosed in U.S. Pat. No. 6,615,698 to Chuang et al., has a pair of trimming units, which are adapted from conventional power miter saws. The blind to be cut down is placed upon a work surface so that each side of the blind is fitted through a trimming unit similar to a miter box. An adjustable end stop is provided near each trimming unit to enable the blind to be positioned in the trimming unit so that the correct amount of material is trimmed from the blind.

Another type of blind cutting machine has a cutting mechanism that can cut only one end of a blind. In this type of machine the operator uses the same cutting mechanism to cut one end or side of the blind then repositions the blind and cuts the opposite end of the blind. Most of these machines have a set of cutting dies that act as the cutting mechanism. The dies are typically arranged along a horizontal axis. There is one die for the headrail, one die for the bottom rail and an opening for the slats or other window covering material. The headrail and bottom rail are inserted into their respective dies and the slats are positioned in the openings. A blade or blades then moves across and opening to cut away material from the headrail, slats and bottom rail. Usually, the blades move together along a horizontal axis.

One shortcoming of the cut down machines known in the art, which do not use a saw, is that none of these machines permit the user to trim the ends of a venetian blind without moving the headrail, bottom rail and slats further apart from one another than they are when packaged.

SUMMARY OF THE INVENTION

We provide a cutting machine for cutting down venetian blinds in which a headrail cutter and a bottom rail cutter are provided and each moves along a horizontal axis. After the headrail and bottom rail are trimmed a slat cutter moves in a vertical axis, up or down, to cut the slats. A support plate has at least one opening for each of a headrail, slats and a bottom rail such that any portion of a venetian blind that extends through these openings will be trimmed by the headrail cutter, slat cutter and bottom rail cutter.

We prefer that the headrail opening, slat opening and the bottom rail opening are sufficiently close to one another so that the closed blind size when inserted into the cut down machine is the same size as when the blind was within a packaging box.

A blade can be used for each of the headrail cutter, the slat cutter and the bottom rail cutter. A set of corresponding dies can be used to cut the headrail and the bottom rail. The headrail cutter and the bottom rail cutter preferably move together. They can be contained in or attached to a single movable plate.

We prefer to provide three headrail openings in the support plate. The blind to be cut is placed on a support table in one of three tracks each aligned with one of the headrail openings. As a result, the machine can be configured to cut venetian blinds of varying lengths as well as other types of window coverings that have a headrail.

The present cutting machine can be used to cut cellular shades, and other window coverings having a headrail. We prefer to provide a clamp mechanism which clamps cellular material while being cut.

Other objects, advantages and aspects of the invention will become apparent from a description of certain present preferred embodiments thereof shown in the drawings

DESCRIPTION OF THE PREFERRED EMBODIMENTS

Figure 1:
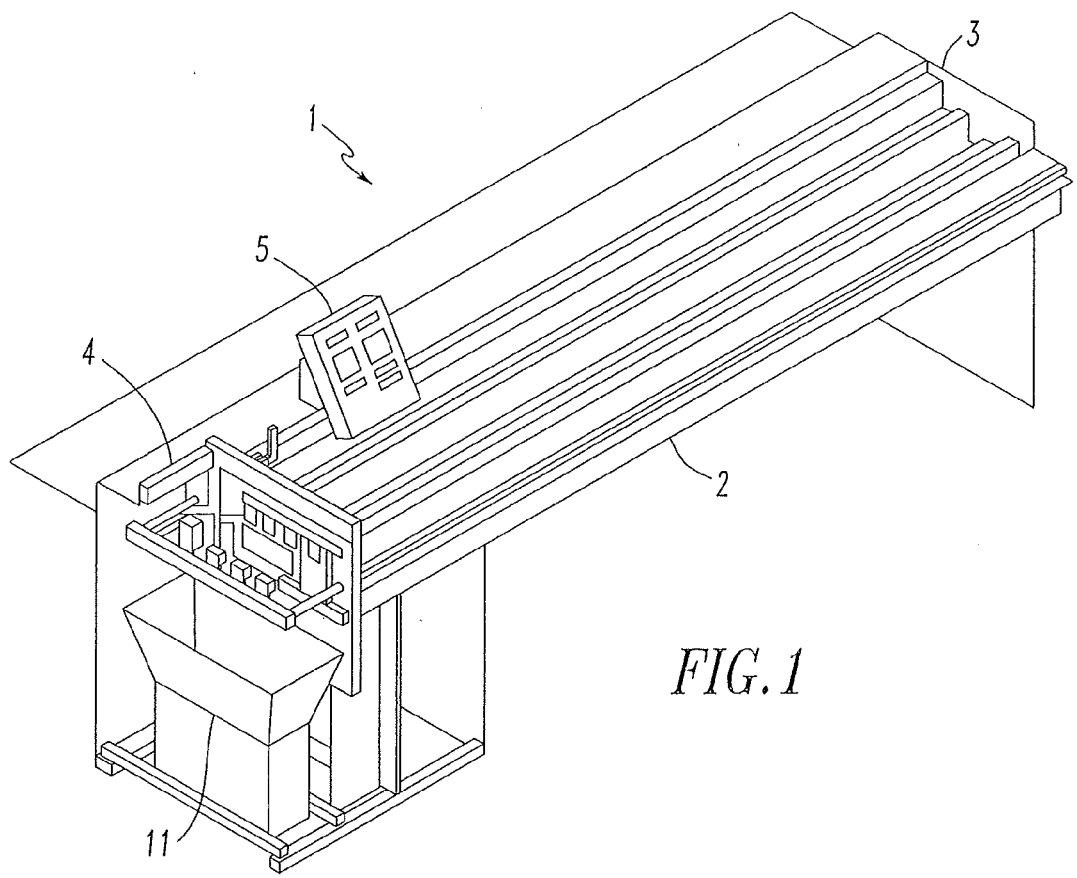
FIG. 1 is a perspective view of the present preferred embodiment of our blind cutting machine from which cover panels have been removed.
Figure 3:
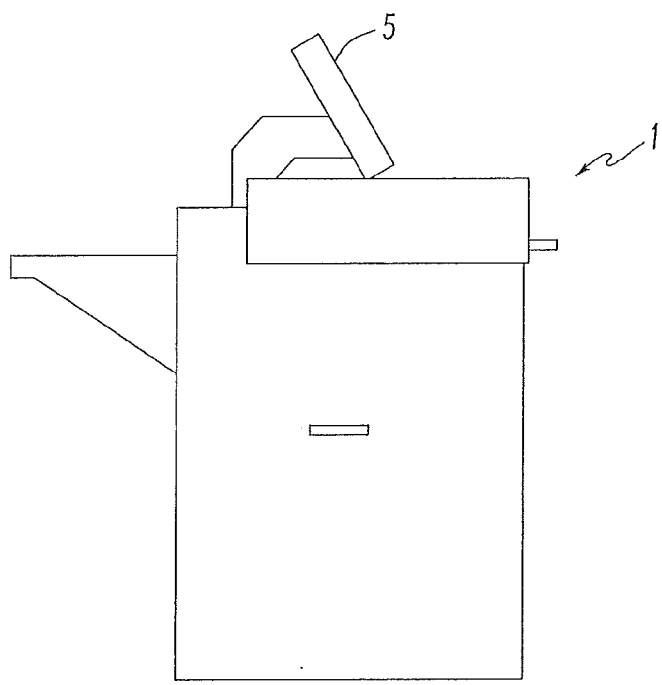
FIG. 3 is an end view of the blind cutting machine shown in FIG. 1 with the end cover panel in place.
Figure 2:
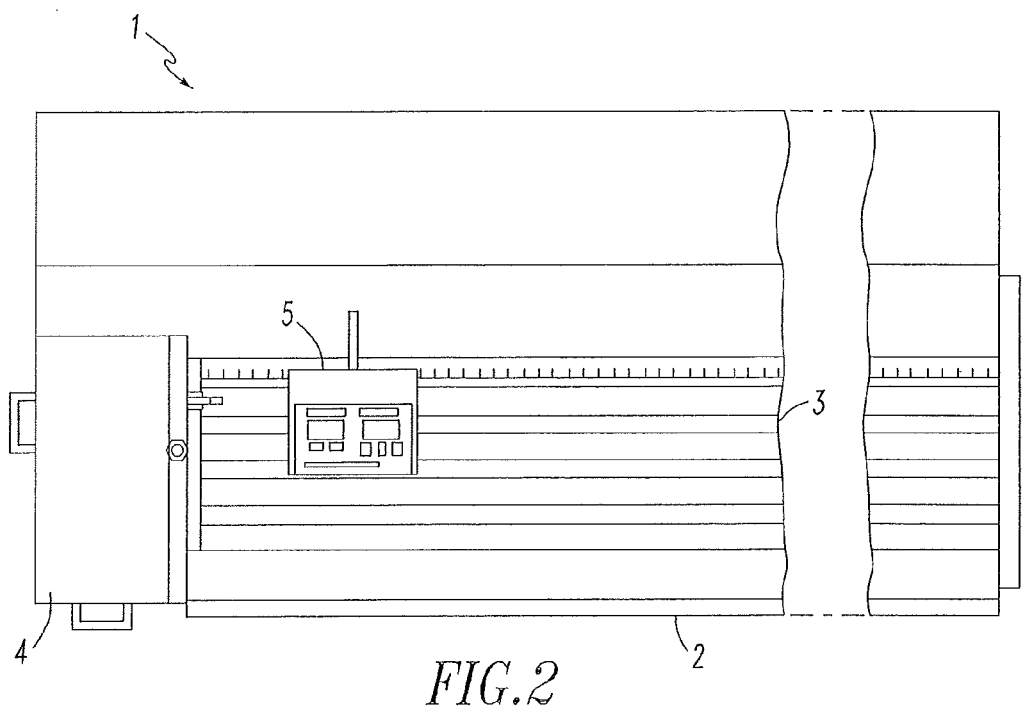
FIG. 2 is a top plan view of the blind cutting machine of FIG. 1.
Figure 4:
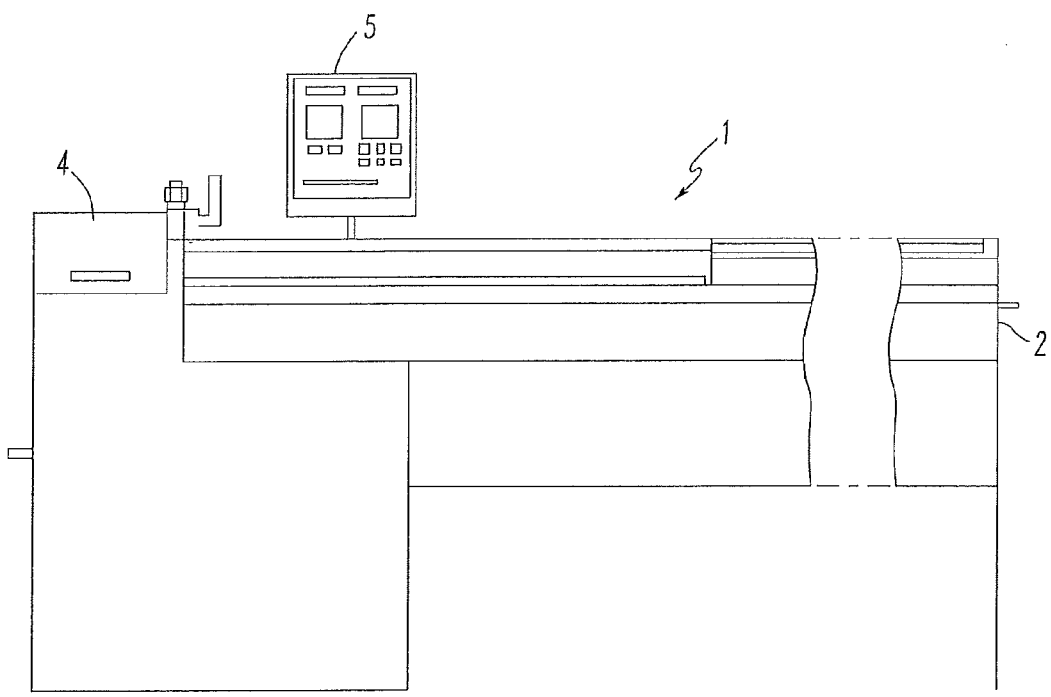
FIG. 4 is a front view of the blind cutting machine shown in FIG. 1 with the front cover panel in place.
Figure 5:
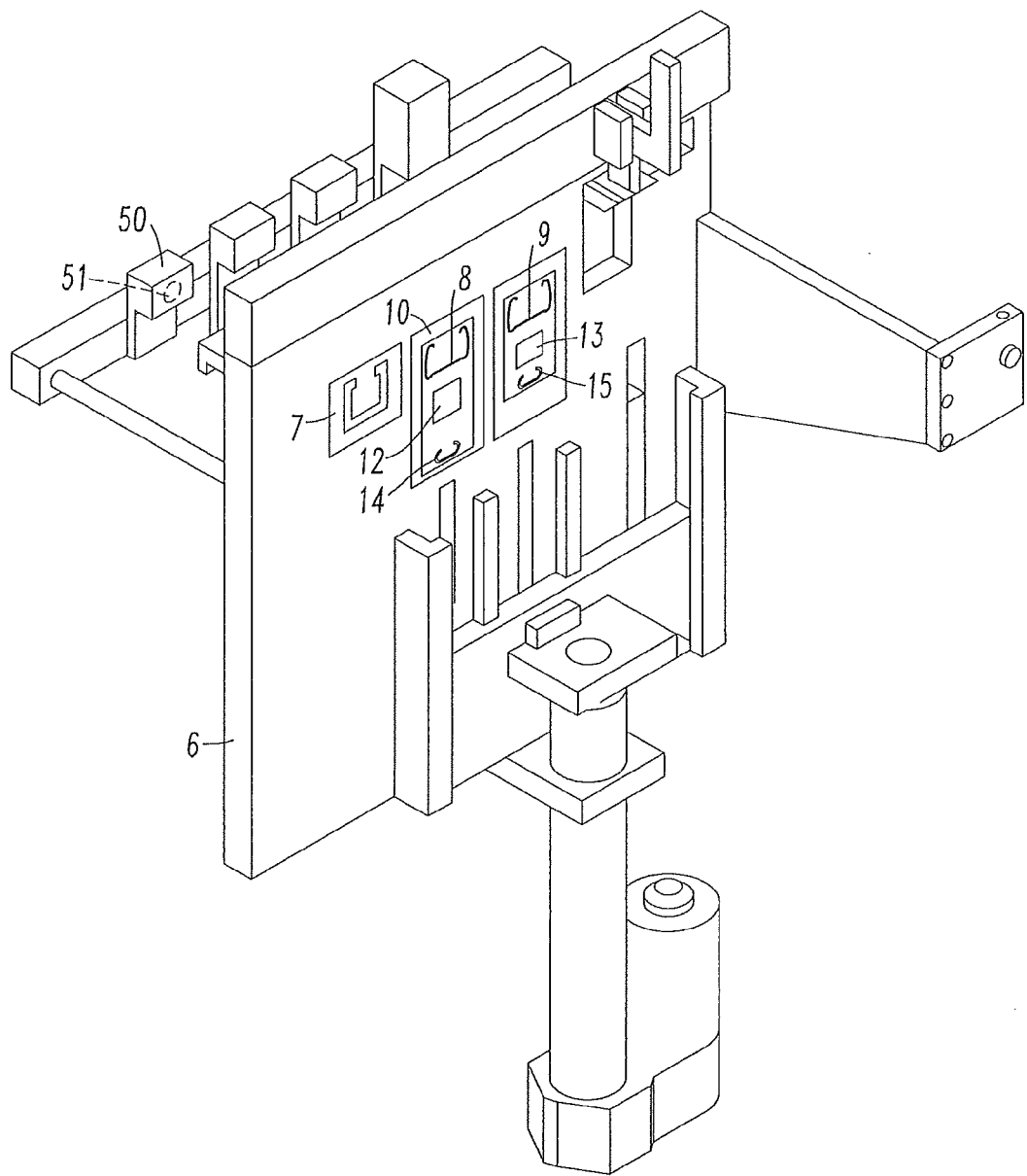
FIG. 5 is a front perspective view of the blind cutting mechanism in the blind cutting machine of FIGS. 1 through 4.

The cutting machine 1 shown in the drawings has a blind support table 2 and a blind cutting mechanism 4. A refuse container 11 is provided under the cutting mechanism. A control pad 5 is positioned on the support table 2. There are three tracks 3 on the table which are aligned with one of three cutting locations in a support housing 6 in the blind cutting mechanism 4. As can be seen most clearly in FIG. 5, each cutting location corresponds to a headrail opening 7, 8 or 9. Each of the headrail openings preferably are formed in a die 10 which is held in the support housing 6. Each headrail opening is configured to receive a headrail. That is, each opening corresponds to a cross section through the headrail. The opening may be tapered to permit easy insertion of the headrail into the opening. Below at least one headrail opening 8, 9 we provide a slat opening 12, 13 and a bottom rail opening 14, 15. In the preferred embodiment shown in FIG. 5, the blind cutting location to the left has only a headrail opening 7 and is used to cut only a headrail. The second and third cutting locations each have separate openings for the headrail, for the bottom rail and for the slats. These two locations differ in that the slat opening 12 in the middle cutting location is longer so as to accommodate a longer venetian blind. At each of the second and third cutting locations the headrail opening, slat opening and bottom rail opening are aligned along a vertical axis. All of the headrail openings 7, 8, 9 are positioned along a first horizontal axis. All of the bottom rail openings 14, 15 lie along a second horizontal axis.

The present cutting machine is particularly useful for trimming standard blinds which are individually packaged in a box. The headrail opening, slat opening and bottom rail opening in the cutting mechanism are spaced apart a known distance which corresponds to the spacing of the headrail, slats and bottom rail from one another while the blind is in the box. Indeed, we prefer to provide collars or spacers on the blinds at the time they are packaged to maintain a desired spacing. One end of the package containing the blind to be cut is opened and the blind is partially removed from the box. The blind to be cut could be in a telescoping box of the type disclosed in published United States Patent Application 2006/0108078. The blind to be cut is placed in one of the three tracks 3. The blind and box are positioned relative to one another so that one end of the blind extends out of the box while the opposite end is within the box. The end of the blind that extends from the box is inserted through the openings at one of the cutting locations. Because the relative spacing of the headrail, slats and bottom rail are the same as the relative spacing of the headrail opening, slat opening and bottom rail opening a sales associate can readily insert one end of the blind into the cutting mechanism and trim the blind.

Figure 6:
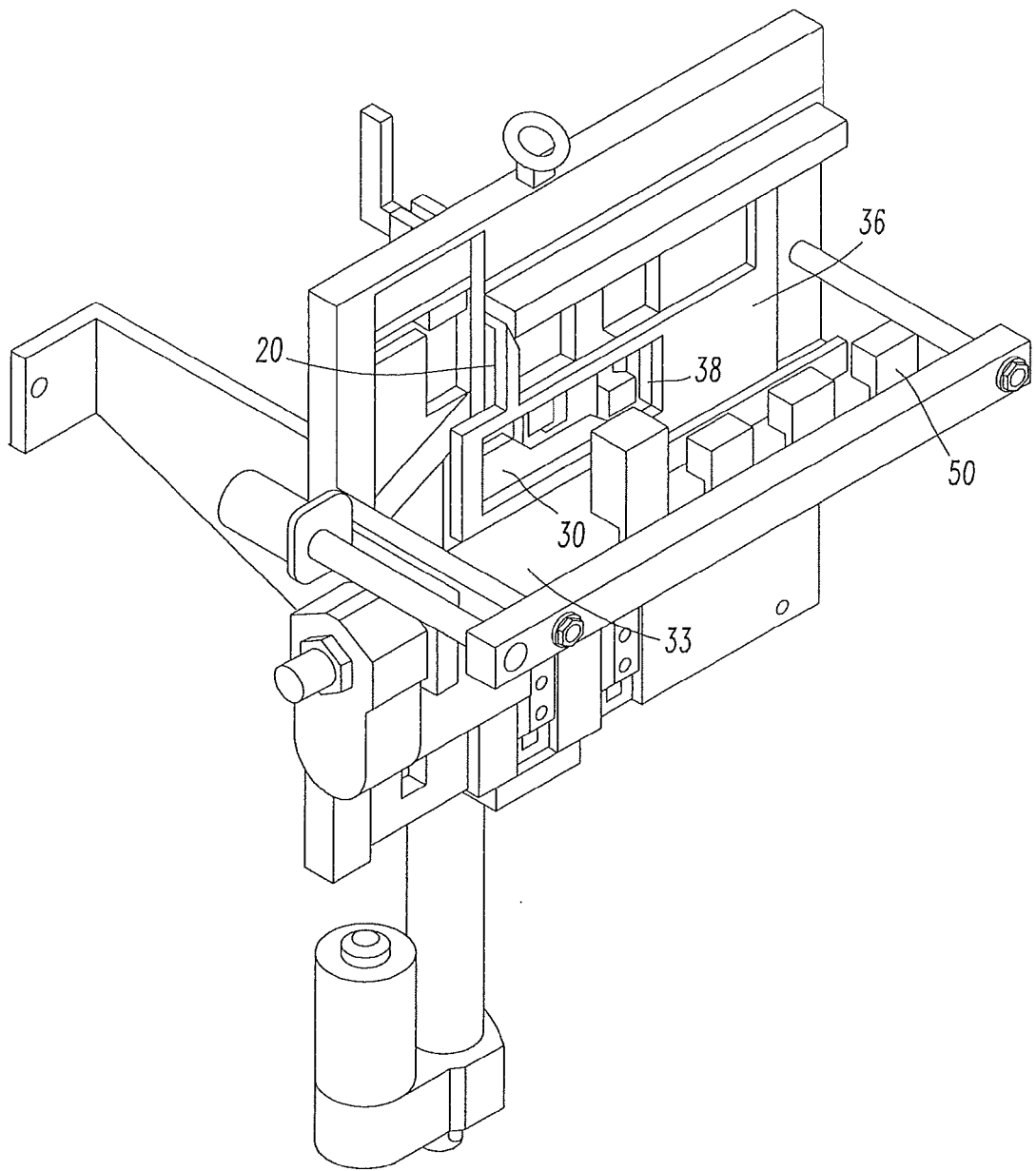
FIG. 6 is a rear perspective view of the blind cutting mechanism shown in FIG. 5.
Figure 7:
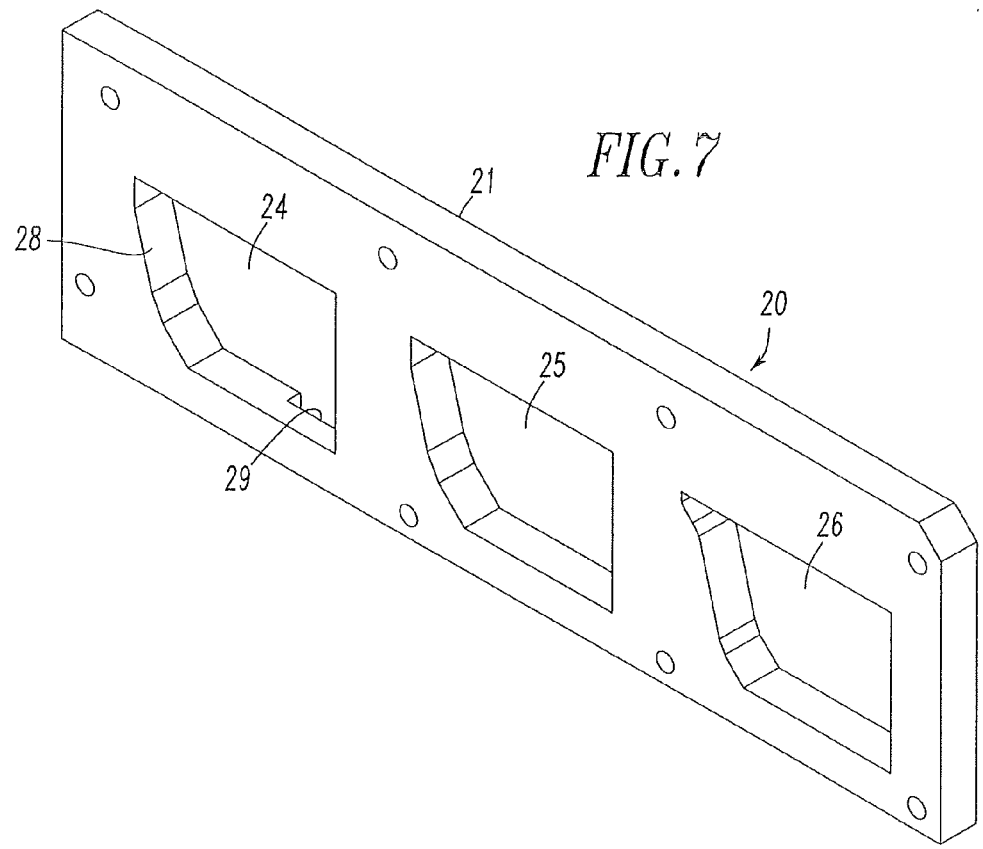
FIG. 7 is a perspective view of a present preferred blade for cutting the headrail.

As can be seen in FIG. 6, we provide a headrail cutter 20 positioned adjacent the support housing on the opposite side of the support housing 6 from which the blind to be cut is located. The headrail cutter and the openings 7, 8, 9 for the headrail in the support housing 6 lie in a common horizontal plane. A present preferred the headrail cutter 20 is shown in FIG. 7. This headrail cutter has an elongated housing 21 having three openings 24, 25, 26. One edge 28 of each opening is a cutting surface or blade. When the headrail cutter is in a rest position the openings 24, 25, 26 in the elongated housing are aligned with the headrail openings 7, 8, 9 in the support housing. The headrail cutter is movable along a horizontal axis from a rest position to a finish position. When the headrail cutter is moved from the rest position to the finish position any portion of a headrail extending through a headrail opening in the support plate will be cut by the headrail cutter. Those skilled in the art will appreciate that the elongated housing 21 may be configured to receive a cutting die in any or all of the openings 24, 25, 26. Such a cutting die would have a headrail opening of the same size and shape as a headrail opening 7, 8, 9 in the support housing 6. When the headrail cutter 20 is in the rest position the opening in each such die in the elongated housing would be aligned with a headrail opening in the support plate 6.

We also provide a bottom rail cutter 30. The bottom rail cutter and the openings 14, 15 for the bottom rail in the support housing 6 lie in a second common horizontal plane. The bottom rail cutter is preferably a blade which can be seen in FIG. 6. If desired the bottom rail cutter could be an elongated housing similar to elongated housing 21 but having two openings which align with bottom rail openings 14 and 15. Such openings could be similar to the openings in the elongated housing 21 shown in FIG. 7 or they may be in a cutting die in the elongated housing. The bottom rail cutter operates in the same manner as the headrail cutter. The bottom rail cutter is movable along a horizontal axis from a rest position to a finish position. When the bottom rail cutter is moved from the rest position to the finish position any portion of a bottom rail extending through a bottom rail opening in the support plate will be cut by the bottom rail cutter. As can be seen in FIG. 6 we prefer to provide a movable plate 36 to which the headrail cutter 20 and the bottom rail cutter 30 are attached. The headrail cutter is attached to the upper portion of that structure 36. The bottom rail cutter 30 is attached to the lower portion of that structure. An opening 38 is provided in the movable plate 36 through which the slats may extend. This opening is sized so that the slats are not cut or hit when the headrail cutter and the bottom rail cutter move from their rest positions to their finish positions. An activator 33 moves the movable plate and attached headrail cutter and bottom rail cutter structure horizontally to cut the headrail and the bottom rail.

After portions of the headrail and the bottom rail have been cut away by the headrail cutter and the bottom rail cutter, one of two separate blades 41, 42 moves vertically to cut the slats. These blades are in separate vertical planes that pass through one of the slat openings 12, 13 in the support housing 6. There are channels or slots 29 in the elongated housing 21 through which the blades 41, 42 can move vertically for cutting the slats.

Figure 8:
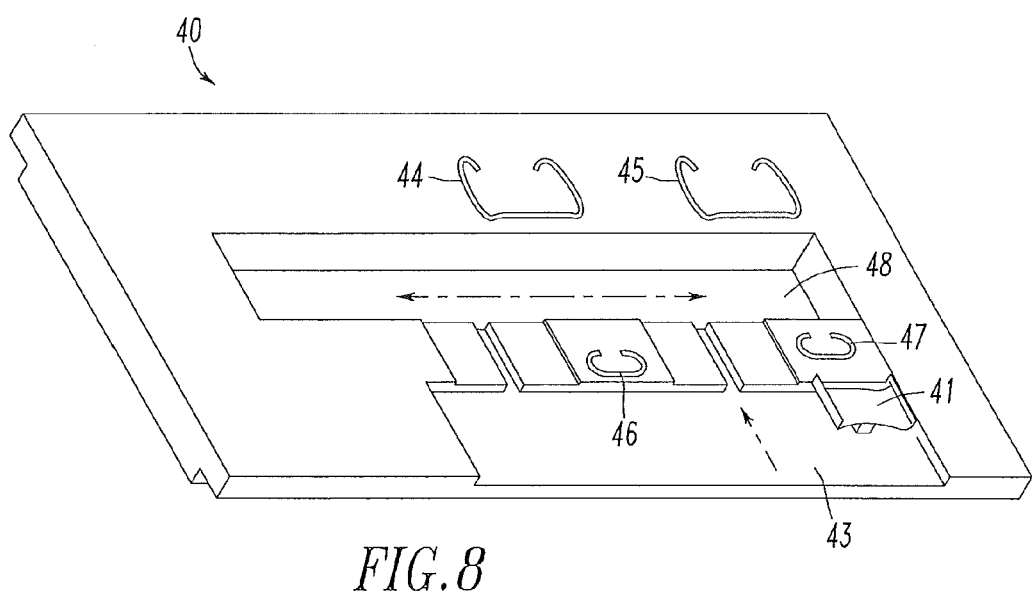
FIG. 8 is a perspective view of an alternative die plate that can be used in the cutting machine of FIGS. 1 through 4 and also showing a blade which is used to cut the slats.
Figure 10:
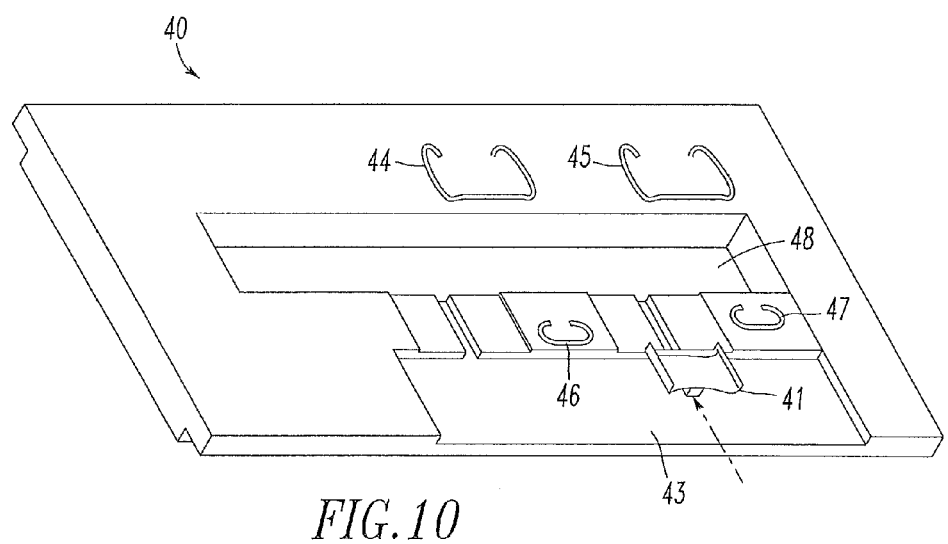
FIG. 10 is a perspective view similar to FIG. 8 showing a portion of the blade which cuts the slats aligned to make the cut.

In a second present preferred embodiment the separate headrail cutter 20 and bottom rail cutter 30 attached to a movable plate 36 are replaced by a single movable plate 40 shown in FIGS. 8 and 10. This plate 40 has two headrail openings 44, 45 and two bottom rail openings 46, 47. These openings will be aligned with the headrail openings 8, 9 and bottom rail openings 14, 15 in support plate 6 when the plate 40 is in a rest position. Consequently, that portion of a headrail that extends through headrail opening 8 or 9 will extend through openings 43 or 44. Similarly, the portion of a bottom rail that extends through opening 14 or 15 will also extend through opening 46 or 47. As can be seen in FIG. 8, a region 48 of the movable plate is open to receive that portion of slats which extend through slat opening 12 or 13 and to enable the movable plate to move horizontally while a portion of slats extends through slat opening 12 or 13.

Figure 9:
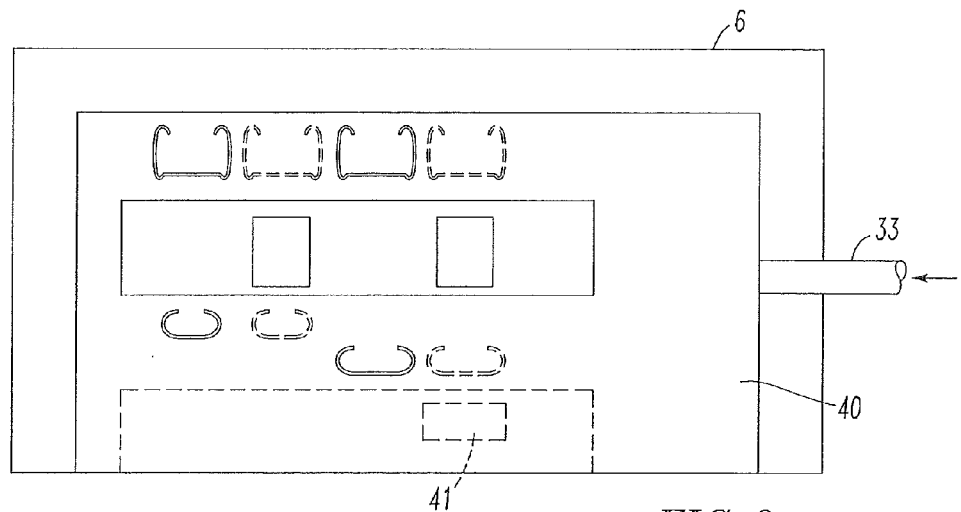
FIG. 9 is a front view of the die plate of FIG. 8 positioned over the stationary plate or housing into which a blind is positioned for cutting.
Figure 11:
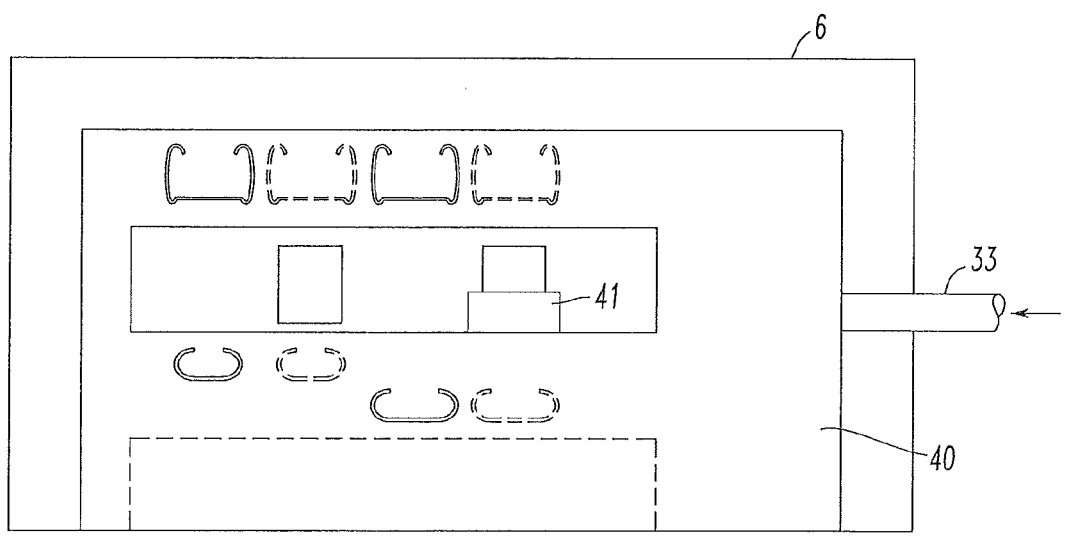
FIG. 11 is a front view similar to FIG. 9 also showing the blade which cuts the slats in a cutting position.

A linear activator 33 moves the movable plate 40 along a horizontal axis from a rest position in which the headrail openings and bottom rail openings are aligned to a finish position shown in FIG. 9 at which the slat cutter blade 41 moves vertically to cut the slats as shown in FIG. 11. The movable plate 40 has a recessed region 43 in which the slat cutter 41 is positioned as the movable plate moves from a rest position to a finish position. In FIG. 8 slat cutter 41 is shown relative to the movable plate at a time when the movable plate is in the rest position. In FIGS. 9 and 10 the movable plate is in a finish position and the slat cutter is positioned for cutting. In FIG. 11, the slat cutter 41 has moved to a position at which any portion of slats in the path of the cutter is being or has been cut.

An end stop 50, shown most clearly in FIG. 6, is movable toward and away from the support plate. The end stop is positioned so that a blind can be inserted to abut the end stop and the correct amount of material will be trimmed from the blind. When the machine is used, the end stop is positioned by a control pad 5 as described in pending U.S. patent application Ser. No. 11/035,604 which is incorporated herein by reference. A sensor 51 may be provided on or within the end stop, or elsewhere in the cutting machine, to indicate when a blind has been inserted into the headrail opening, slat opening and bottom rail opening. Once the end stop is correctly positioned for the cut to be made the blind must abut the end stop for the proper amount of material to be removed. The sensor would only be activated when the blind is abutting the end stop.

To operate the cutting machine 1 a blind is set into the appropriate work table channel 3, corresponding to the correct die opening for that blind. Preferably the blind is in a telescoping box, but the blind is not fully removed from the package. The user, by collapsing or opening the box, exposes an end of the blind, which, without manual adjustment or other positioning beyond putting the package in the channel, is fed into the openings of the die. The die openings on the machine have an exceptionally large taper on the "In" side to allow this hands-off insertion of the blind into the die. Once the blind has been inserted to abut the end stop, the user activates the actual cutting process by pushing and holding two "Run" buttons on the control pad, which sends a signal to the microprocessor to start the sequence as follows:

a. Die actuator moves the headrail cutter and the bottom rail cutter in a horizontal direction, cutting headrail and bottom rail, until it trips a limit switch, at which time it stops and remains in place.

b. The blade actuator then moves the slat cutter blades upward or downward depending upon their location relative to the slats, perpendicular to the direction of the movement of the headrail cutter and the bottom rail cutter, cutting the salts until tripping a limit switch.

c. The blade then reverses direction until reaching its home or rest position again.

d. When blade is in home position, the headrail cutter and bottom rail cutter move backward until they reach their home or rest position as well.

These two perpendicular and sequential motions allow one to cut the blind not only without removing it from its package, but also while keeping the package size to a minimum. Other cut-down machines use an arrangement where the blade to cut the slats is positioned between the bottom rail die opening and the slat opening (so the blind has to be "spread open" before it's inserted in the machine.) The result of this orientation, would be that one would be required to space the bottom rail and slats much further apart in the package so that the blind aligns with the machine opening, creating excessive wasted space within the package, and in turn, on the storage shelf. The perpendicular die/blade cutting sequence cannot be performed simultaneously because before the blade can safely pass through the slats, the bottom rail needs to be trimmed out of the way (in our case, by the bottom rail cutter).

Although we have described the cutting machine in the context of cutting a venetian blind, this machine could be used to cut most of the window covering products that have a headrail. This single machine can cut five different products including venetian blinds having vinyl or metal slats, vertical blind slats, pleated and cellular shades. Consequently, the term slat opening should be understood to encompass an opening which can receive cellular, pleated or other window covering material that is hung from a headrail. The machine can be completely automated with two actuators, one that will push the headrail cutter and bottom rail cutter forward (horizontally) cutting the headrail and bottom rail at the same time and one that moves the slat cutter vertically cutting the slats. This machine works as a two step process with the first process cutting the bottom rail and headrail and the second process cutting the slats. The first process must happen to clear the ends of the headrail and bottom rail out of the way of the slat cutter.

Figure 12:
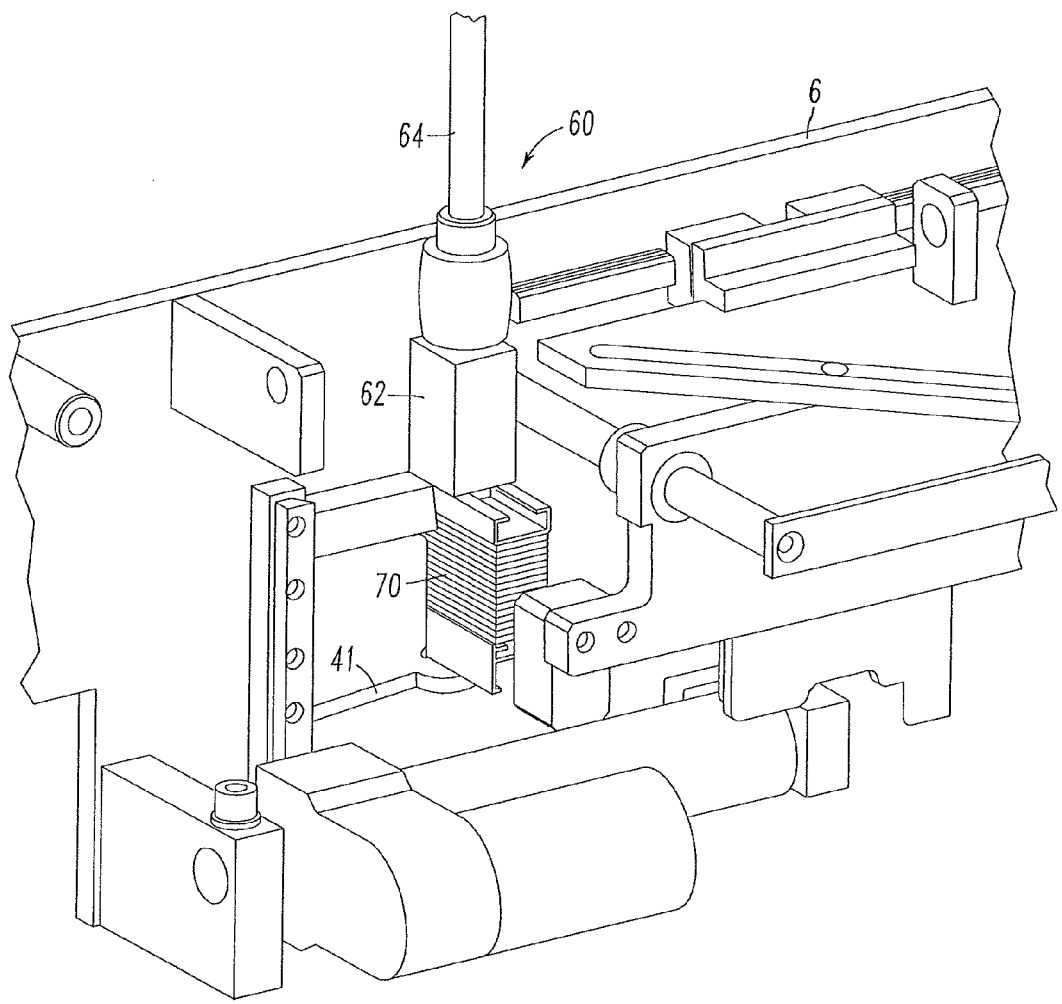
FIG. 12 is a rear view of a second preferred blind cutting mechanism in which a clamp mechanism is provided.

In the event that the machine is to be used to trim cellular shades or pleated shades to be used to trim cellular shades or pleated shades we prefer to provide a clamping mechanism 60 shown in FIG. 12. In this figure, one end of a shade 70 is shown extending through the headrail opening, slat opening and bottom rail opening in the support plate 6. A clamping mechanism is attached to the support plate. The clamping mechanism is comprised of an anvil 62 attached to an actuator 64. After the headrail has been cut away the actuator moves the anvil 62 to press against the cellular material. Then the blade 41 moves upward, cutting away the excess cellular material.

In the preferred embodiments the slat cutter moves upward to make the cut and any clamping mechanism moves downward. One could configure the cutting machine so that the slat cutter moves down from a position above the headrail cutter to cut the slats, cellular material or other window covering material and any clamping mechanism moves up.

Yet another alternative is to rotate the cutting mechanism 180° so that the headrail opening, slat opening and bottom rail opening lie on a horizontal axis. In that embodiment the headrail cutter and bottom rail cutter would move along a vertical axis and the slat cutter and any clamp mechanism would move along a horizontal axis. This embodiment may contain all features of the previous embodiments.

Although we have described and illustrated certain present preferred embodiments of our cutting machine it should be distinctly understood that our invention is not limited thereto but may be variously embodied within the scope of the following claims.

We claim:

1. A blind cutting machine comprised of:
  a blind support table having a surface on which a blind to be cut is placed, and a cutting mechanism adjacent to the support table, the cutting mechanism comprised of:
  a support housing having a headrail opening, a slat opening and a bottom rail opening consecutively positioned along a vertical axis,
  a headrail cutter positioned adjacent the support housing along a horizontal plane, the plane passing through the headrail opening, the headrail cutter movable along a horizontal axis from a rest position to a finish position such that when the headrail cutter is moved from the rest position to the finish position any portion of a headrail extending through the headrail opening will be cut by the headrail cutter;

a bottom rail cutter positioned adjacent the support housing along a second horizontal plane, the second horizontal plane passing through the bottom rail opening, the bottom rail cutter movable along a second horizontal axis from a rest position to a finish position such that when the bottom rail cutter is moved from the rest position to the finish position any portion of a bottom rail extending through the bottom rail opening will be cut by the bottom rail cutter; and a slat cutter positioned adjacent the support housing along a vertical plane, the vertical plane passing through the slat opening, the slat cutter movable along a vertical axis from a rest position below the headrail opening, slat opening and bottom rail opening to a finish position such that when the slat cutter is moved from the rest position to the finish position any portion of slats extending through the slat opening will be cut by the slat cutter;

wherein the headrail cutter and the bottom rail cutter are sized and configured such that neither cutter passes over the slat opening when moved from a rest position to a finish position.

2. The blind cutting machine of claim 1 wherein the headrail opening, the slat opening and the bottom rail opening are sufficiently close to one another that one end of a venetian blind can be inserted into the headrail opening, the slat opening and bottom rail opening while an opposite end of the venetian blind is within a packaging box.

3. The blind cutting machine of claim 1 also comprising a movable blade support to which the headrail cutter and the bottom rail cutter are attached.

4. The blind cutting machine of claim 1 also comprising a movable end stop attached to at least one of the cutting mechanism and the blind support table.

5. The blind cutting machine of claim 1 also comprising a first actuator connected to the headrail cutter and the bottom rail cutter for simultaneously moving the headrail cutter and the bottom rail cutter from their rest positions to their finish positions;

a second actuator connected to the slat cutter for moving the slat cutter from its rest position to its finish position; and a controller connected to the first actuator and the second actuator.

6. The blind cutting machine of claim 5 also comprising a sensor connected to the controller and positioned to determine when a venetian blind is within the headrail opening, the slat opening and the bottom rail opening.

7. The blind cutting machine of claim 1 wherein at least one of the headrail opening, the slat opening and the bottom rail opening is tapered.

8. The blind cutting machine of claim 1 wherein the support housing has a second headrail opening, a second slat opening and a second bottom rail opening consecutively positioned along a second vertical axis.

9. The blind cutting machine of claim 8 wherein the support housing has a third headrail opening.

10. The blind cutting machine of claim 8 wherein the second headrail opening, the second slat opening and the second bottom rail opening are sufficiently close to one another that one end of a venetian blind can be inserted into the second headrail opening, the second slat opening and the second bottom rail opening while an opposite end of the venetian blind is within a packaging box.

11. The blind cutting machine of claim 8 wherein the second slat opening is larger than the slat opening.

12. The blind cutting machine of claim 1 wherein at least one of the headrail cutter and the bottom rail cutter is a cutting die.

13. The blind cutting machine of claim 1 wherein at least one of the headrail cutter, the slat cutter and the bottom rail cutter is a blade.

14. The blind cutting machine of claim 1 also comprising a clamping mechanism attached to the support housing.

15. A method of trimming a window covering product having a headrail, bottom rail and window covering material connected between the headrail and the bottom rail comprising, placing the window covering product in a blind cutting machine containing a support housing having a headrail opening, a slat opening and a bottom rail opening consecutively positioned along a vertical axis, such that a portion of each of the headrail, window covering material and bottom rail extends through the headrail opening, slat opening and bottom rail opening respectively;

moving a headrail cutter along a first horizontal axis to cut the portion of the headrail;

moving a bottom rail cutter along a second horizontal axis to cut the portion of the bottom rail; and thereafter moving a slat cutter along a vertical axis from a position below the headrail opening, slat opening and bottom rail opening to cut the portion of the window covering material.

16. The method of claim 15 also comprising clamping the window covering material while the slat cutter is moving along the vertical axis.

17. The method of claim 15 wherein the headrail cutter and the bottom rail cutter are moved simultaneously.

18. The method of claim 15 also comprising selecting a blind to be cut in which the headrail, window covering material and bottom rail are spaced apart a known distance from one another and wherein the headrail opening, slat opening and bottom rail opening are spaced apart a distance which corresponds to the known distance which the headrail, window covering material and bottom rail are spaced apart.

19. A blind support table comprising a surface on which a blind to be cut is placed and a cutting mechanism adjacent to the support table, the cutting mechanism comprised of:

a support housing having a headrail opening, a slat opening and a bottom rail opening consecutively positioned along a horizontal axis, a headrail cutter positioned adjacent the support housing along a vertical plane, the plane passing through the headrail opening, the headrail cutter movable along a vertical axis from a rest position to a finish position such that when the headrail cutter is moved from the rest position to the finish position any portion of a headrail extending through the headrail opening will be cut by the headrail cutter;

a bottom rail cutter positioned adjacent the support housing along a second vertical plane, the second vertical plane passing through the bottom rail opening, the bottom rail cutter movable along a second vertical axis from a rest position to a finish position such that when the bottom rail cutter is moved from the rest position to the finish position any portion of a bottom rail extending through the bottom rail opening will be cut by the bottom rail cutter; and a slat cutter positioned adjacent the support housing along a horizontal plane, the horizontal plane passing through the slat opening, the slat cutter movable along a horizontal axis from a rest position to a finish position such that when the slat cutter is moved from the rest position to the finish position any portion of slats extending through the slat opening will be cut by the slat cutter;

wherein the headrail cutter and the bottom rail cutter are sized and configured such that neither cutter passes over the slat opening when moved from a rest position to a finish position;

at least one of a headrail cutter support and a bottom rail cutter support, the headrail cutter support being attached to the headrail cutter, such that movement of the headrail cutter support causes movement of the headrail cutter, and the bottom rail cutter support being attached to the bottom rail cutter, such that movement of the bottom rail cutter support causes movement of the bottom rail cutter; and wherein the at least one of the headrail cutter support and the bottom rail cutter support has a channel through which the window covering material cutter passes.

20. The blind cutting machine of claim 19 wherein the headrail opening, the slat opening and the bottom rail opening are sufficiently close to one another that one end of a venetian blind can be inserted into the headrail opening, the slat opening and bottom rail opening while an opposite end of the venetian blind is within a packaging box.

21. The blind cutting machine of claim 19 wherein the at least one of the headrail cutter support and the bottom rail cutter support comprise also comprising a movable blade support to which one of the headrail cutter and the bottom rail cutter are attached.

22. The blind cutting machine of claim 19 also comprising a movable end stop attached to at least one of the cutting mechanism and the blind support table.

23. The blind cutting machine of claim 19 also comprising a first actuator connected to the headrail cutter and the bottom rail cutter for simultaneously moving the headrail cutter and the bottom rail cutter from their rest positions to their finish positions;

a second actuator connected to the slat cutter for moving the slat cutter from its rest position to its finish position; and a controller connected to the first actuator and the second actuator.

24. The blind cutting machine of claim 23 also comprising a sensor connected to the controller and positioned to determine when a venetian blind is within the headrail opening, the slat opening and the bottom rail opening.

25. The blind cutting machine of claim 19 wherein at least one of the headrail opening, the slat opening and the bottom rail opening is tapered.

26. The blind cutting machine of claim 19 wherein the support housing has a second headrail opening, a second slat opening and a second bottom rail opening consecutively positioned along a second horizontal axis.

27. The blind cutting machine of claim 26 wherein the support housing has a third headrail opening.

28. The blind cutting machine of claim 26 wherein the second headrail opening, the second slat opening and the second bottom rail opening are sufficiently close to one another that one end of a venetian blind can be inserted into the second headrail opening, the second slat opening and the second bottom rail opening while an opposite end of the venetian blind is within a packaging box.

29. The blind cutting machine of claim 26 wherein the second slat opening is larger than the slat opening.

30. The blind cutting machine of claim 19 wherein at least one of the headrail cutter and the bottom rail cutter is a cutting die.

31. The blind cutting machine of claim 19 wherein at least one of the headrail cutter, the slat cutter and the bottom rail cutter is a blade.

32. The blind cutting machine of claim 19 also comprising a clamping mechanism attached to the support housing.

33. A method of trimming a window covering product having a headrail, bottom rail and window covering material connected between the headrail and the bottom rail comprising, placing the window covering product in a blind cutting machine containing a support housing having a headrail opening, a slat opening and
a bottom rail opening consecutively positioned along a horizontal axis, such that a portion of each of the headrail, window covering material and bottom rail extends through the headrail opening, slat opening and bottom rail opening respectively;

moving a headrail cutter attached to a headrail cutter support along a first vertical axis to cut the portion of the headrail;

moving a bottom rail cutter attached to a bottom rail cutter support along a second vertical axis to cut the portion of the bottom rail; and thereafter moving a slat cutter through a channel formed in at least one of the headrail cutter support and the bottom rail cutter support along a horizontal axis to cut the portion of the window covering material.

34. The method of claim 33 also comprising clamping the window covering material while the slat cutter is moving along the horizontal axis.

35. The method of claim 33 wherein the headrail cutter and the bottom rail cutter are moved simultaneously.

* * * * *